United States Patent [19]

Ogawa

[11] Patent Number: 4,498,433
[45] Date of Patent: Feb. 12, 1985

[54] MEMBER SUCH AS AN ENGINE COVER ADJACENT TO AN AUTOMOTIVE ENGINE

[75] Inventor: Naoki Ogawa, Yokohama, Japan

[73] Assignee: Nissan Motor Company, Limited, Yokohama, Japan

[21] Appl. No.: 505,724

[22] Filed: Jun. 20, 1983

Related U.S. Application Data

[63] Continuation of Ser. No. 150,901, May 16, 1980, abandoned.

[30] Foreign Application Priority Data

May 18, 1979 [JP] Japan ................................ 54-61766
May 31, 1979 [JP] Japan ................................ 54-67765
May 31, 1979 [JP] Japan ................................ 54-67766
May 31, 1979 [JP] Japan ................................ 54-67767

[51] Int. Cl.³ .............................................. F02M 9/10
[52] U.S. Cl. ............................ 123/90.38; 123/195 C; 428/74; 181/204
[58] Field of Search ............... 123/195 C, 195 R, 668, 123/669, 198 E, 90.38; 428/74; 181/204

[56] References Cited

U.S. PATENT DOCUMENTS

| | | | |
|---|---|---|---|
| 3,092,203 | 6/1963 | Slayter et al. | 428/320 |
| 3,112,810 | 12/1963 | Nallinger | 181/204 |
| 3,654,012 | 4/1972 | Schlager | 156/212 |
| 3,697,369 | 10/1972 | Amberg et al. | 156/160 |
| 3,957,558 | 5/1976 | Lee et al. | 156/212 |
| 4,035,215 | 7/1977 | Goldstone | 156/245 |
| 4,048,366 | 9/1971 | Kingsbury | 123/195 C |
| 4,101,003 | 7/1978 | Timour et al. | 123/195 C |
| 4,194,938 | 3/1980 | Figge et al. | 156/212 |
| 4,337,116 | 6/1982 | Foster et al. | 156/212 |

FOREIGN PATENT DOCUMENTS

| | | |
|---|---|---|
| 0070500 | 1/1983 | European Pat. Off. ........ 123/195 C |
| 2157586 | 6/1973 | France . |
| 2234627 | 1/1975 | France . |
| 2357504 | 2/1978 | France . |
| 9106 | 5/1964 | Japan . |
| 103769 | 8/1977 | Japan . |
| 499667 | 1/1939 | United Kingdom . |
| 791981 | 3/1958 | United Kingdom . |
| 1154363 | 6/1969 | United Kingdom . |
| 1298574 | 12/1972 | United Kingdom . |
| 1325707 | 8/1973 | United Kingdom . |
| 1330485 | 9/1973 | United Kingdom . |
| 1400447 | 7/1975 | United Kingdom ............ 123/195 C |
| 1410689 | 10/1975 | United Kingdom . |
| 1426932 | 3/1976 | United Kingdom . |
| 1452654 | 10/1976 | United Kingdom . |
| 1459301 | 12/1976 | United Kingdom . |

Primary Examiner—Craig R. Feinberg
Attorney, Agent, or Firm—Lowe, King, Price & Becker

[57] ABSTRACT

A member adjacent to an engine, as an engine cover such as an engine head cover and oil pan and an air cleaner, is made of fiber layers by shaping organic or inorganic fibers mixed with a resin and its crosslinking agent while heating so as to cause a crosslinking reaction, thereby absorbing vibrations transmitted from an engine and remarkably decreasing noises resulting from surface vibrations of the member with the aid of the damping capacity of the fiber layers.

11 Claims, 31 Drawing Figures

FIG. 3 _PRIOR ART_
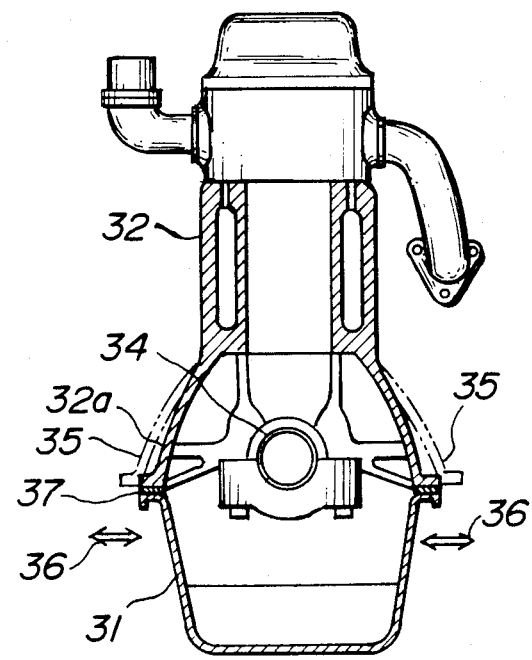
FIG. 4
_PRIOR ART_
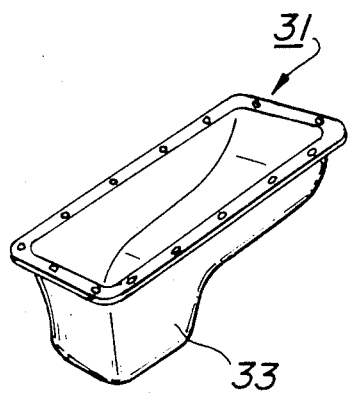

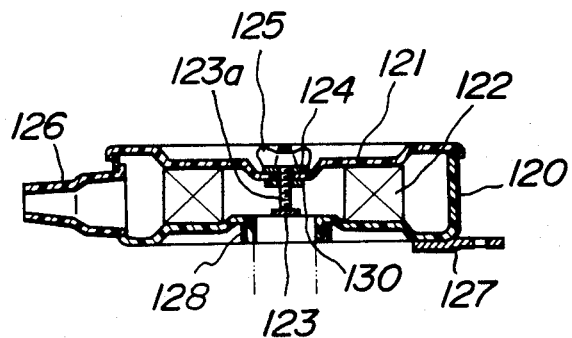
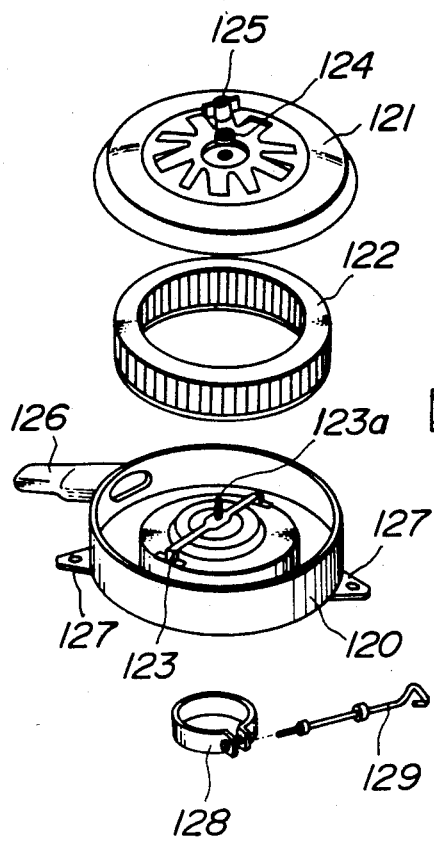
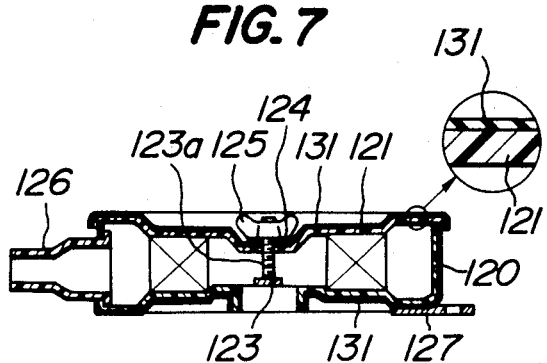
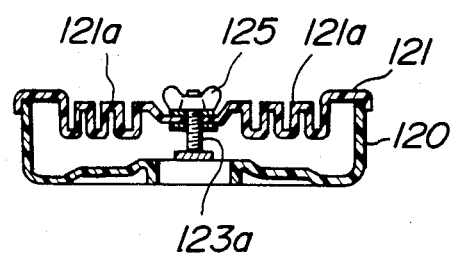

FIG._18
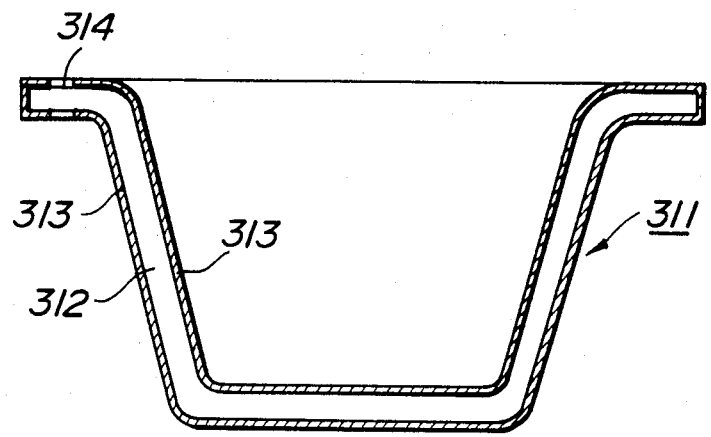
FIG._19 a
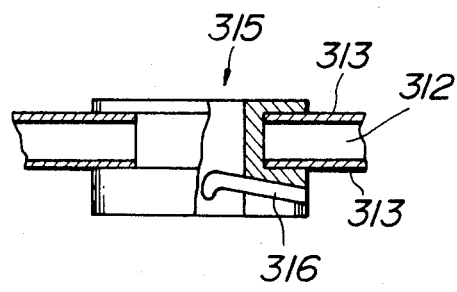
FIG._20
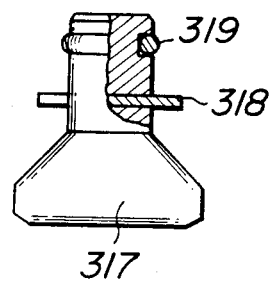
FIG._19 b
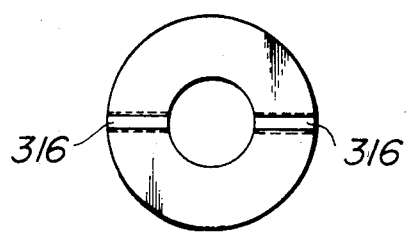

MEMBER SUCH AS AN ENGINE COVER ADJACENT TO AN AUTOMOTIVE ENGINE

This application is a continuation of application Ser. No. 150,901 filed May 16, 1980, now abandoned.

BACKGROUND OF THE INVENTION

1. Field of the Invention

The present invention relates to a member adjacent to an automotive engine, as an engine cover such as an engine head cover and an oil pan and an air cleaner, which is capable of decreasing noises due to engine operations.

2. Description of the Prior Art

There are many parts adjacent to an engine for a vehicle, which are likely to vibrate and cause noises due to vibrations transmitted from the engine.

For example, an air cleaner 1 hitherto used for an engine is shown in FIG. 1, which comprises a main metal casing 2 and a cover 3 to form a housing in which an annular filter element 4 and packings 5, 6 and 7 for urging supporting the element 4. The cover 3 is secured by means of a threaded rod and a wing nut 9 through a packing 8 to the main casing 2 which is in turn fixed to a carburetor (not shown) of the engine through an insulator 10 by means of a clamp 11 and a bolt 12.

With such an air cleaner hitherto used, the main casing 2 and cover 3 are likely to transmit vibrations and formed parts of metal (plates) having low damping capacities, so that vibrations of the engine are transmitted from the carburetor to the air cleaner 1 to vibrate the main casing 2 and cover 3 so as to cause noises.

In general, moreover, a limited engine room does not provide a space sufficient to meet a required volume of the air cleaner. Accordingly, a capacity of the air cleaner for absorbing noises caused by an air intake of the engine is too small to muffle the great noises.

A cylinder head cover for an automotive engine in prior art consists generally of an integral metal cover 21 having an oil filler hole 24 and a blow-by gas outlet 25 secured through an oil seal or gasket 23 to a cylinder head 22 by means of bolts 26 as shown in FIG. 2.

As the cylinder head cover and cylinder head are thus rapidly connected and the cylinder head cover itself is apt to transmit vibrations, vibrations are transmitted from the engine to whole over the cylinder head cover to cause it to violently vibrate, thereby forming a source of noises by the cylinder head cover itself. Such noises are remarkably greater than the noises occurred at moving valves of the engine and transmitted through the cylinder head cover and provided a large problem to be solved.

An oil pan 31 has been used as shown in FIG. 3. As shown in FIG. 4, the oil pan 31 includes a partially deeper portion to form an oil reservoir 33 and is made of a thin steel sheet in consideration of light weight and heat dissipation. The oil pan 31 is rigidly fixed at its upper peripheries to lower peripheries of a skirt 32a of a cylinder block 32 through sealing materials 37 in an oil-tight manner as shown in FIG. 3.

The oil pan 31 thus mounted is likely to vibrate in directions of arrows 36 because of vibrations of the skirt 32a having a relatively low rigidity as shown in phantom lines 35 due to vibrations of a bearing cap portion 34 of the cylinder block 32. Such vibrations of the oil pan 31 cause noises which are part of the noises of the engine dissipating out of the engine room.

SUMMARY OF THE INVENTION

It is an object of the invention to provide a member adjacent to an automotive engine as an engine cover such as an engine head cover and an oil pan and an air cleaner, which eliminates all the drawbacks of the prior art.

It is another object of the invention to provide a member adjacent to an engine, made of organic or inorganic fibers mixed with a resin and its crosslinking agent by pressing while heating the fibers so as to cause the cross-linking reaction, which prevents vibrations of itself due to vibrations of the engine to reduce noises caused by the vibrations and reduces noises due to the intake air with the aid of the sound adsorption effect of the fibers, thereby remarkably reducing the noises caused by the engine.

It is further object of the invention to provide a member adjacent to an engine, made of organic or inorganic fibers mixed with a resin and its crosslinking agent by pressing while heating the fibers so as to cause the cross-linking reaction and formed with at least on its inner surface with an air-tight layer to prevent an oil such as engine oil from penetrating into the fiber layer.

It is another object of the invention to provide a member adjacent to an engine, which is made by steps of shaping a permeable material in a required form, locating a film on the inside of the permeable material, and applying negative pressure to the outside of the permeable material to attract and fix the film to the inner surface of the permeable material, thereby forming an oil-tight layer.

In order that the invention may be more clearly understood, preferred embodiments will be described, by way of example, with reference to the accompanying drawings.

BRIEF DESCRIPTION OF THE DRAWINGS

FIG. 3 is an explanatory sectional view of an engine illustrating an oil pan in the prior art as mentioned above;

FIG. 4 is a perspective view of the oil pan shown in FIG. 3;

FIG. 5 is an exploded perspective view of an air cleaner according to the invention;

FIG. 6 is a sectional view of the air cleaner shown in FIG. 5;

FIG. 7 is a sectional view illustrating an air cleaner of another embodiment of the invention;

FIG. 8 is a sectional view showing an air cleaner of further embodiment of the invention;

FIG. 18 is a sectional view of an oil pan of one embodiment of the invention;

FIGS. 19a and 19b illustrate a bracket for an oil drain for use in the oil pan in FIG. 18;

FIG. 20 illustrates an oil drain plug for use in the bracket in FIGS. 19a and 19b;

DETAILED DESCRIPTION OF THE PREFERRED EMBODIMENT

Figure 1:
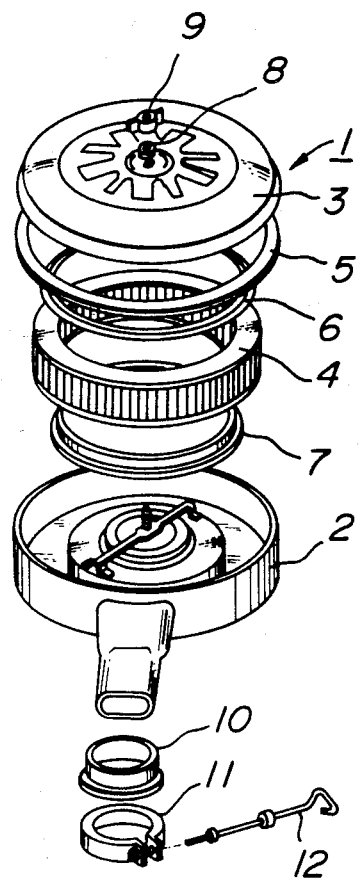
FIG. 1 is an exploded perspective view of an air cleaner in the prior art as mentioned above.
Figure 2:
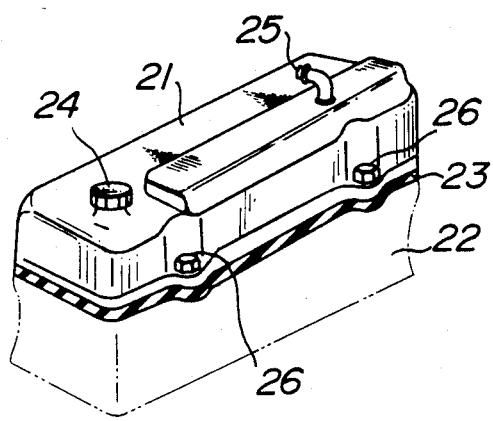
FIG. 2 is a perspective view of a cylinder head cover in the prior art as mentioned above.
Figure 9:
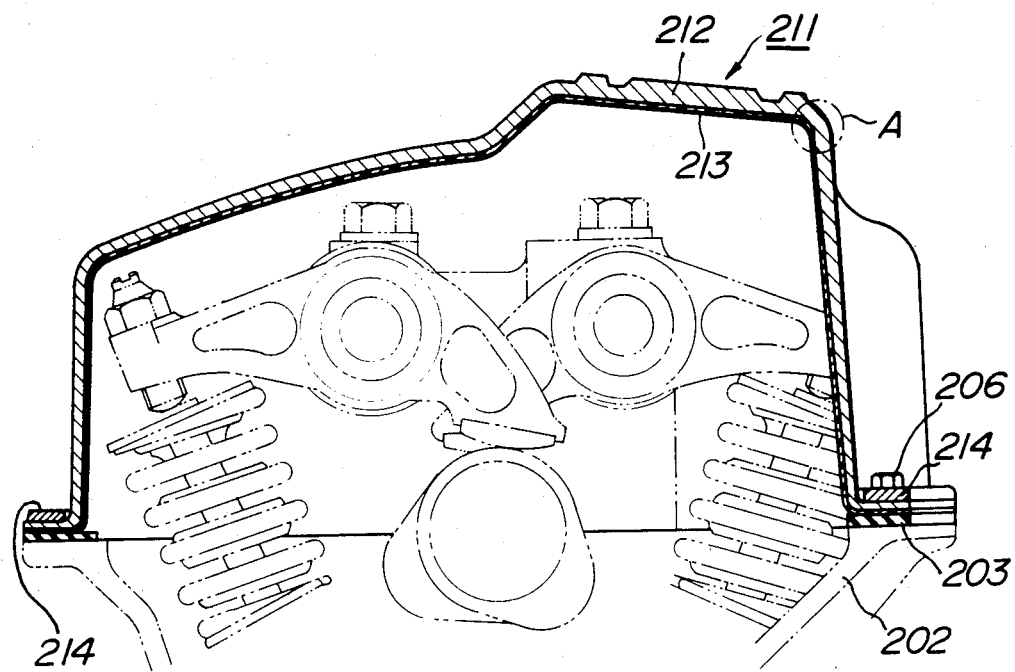
FIG. 9 is a cross-sectional view of a cylinder head cover of one embodiment of the invention.
Figure 10:
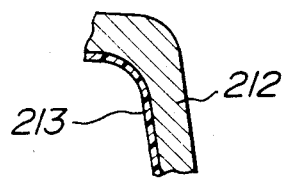
FIG. 10 is a detailed sectional view of A portion in FIG. 9.

Referring to FIG. 5 which is an exploded perspective view illustrating one embodiment of the invention, an air cleaner comprises a main casing 120, a cover 121 and a filter element 122. According to the invention, organic or inorganic fibers mixed with a resin such as acrylic, phenol resin or the like and its crosslinking agent as formalin (trade name of formaldehyde) are shaped by means of a press, while heating the fibers so as to cause a crosslinking reaction to form these main casing 120 and cover 121. The main casing 120 and cover 121 thus formed include therein slight clearances in the fibers and between them due to the porosity of their materials to cause damping performance and silencing effect.

A bracket 123 having a bolt 123a secured thereto is fixed by means of an adhesive to the main casing 120 to which is secured the cover 121 through a packing 124 by means of a wing nut 125 threadedly engaged with the bolt 123a. A duct 126 for air intake is secured to a side surface of the main casing 120 as by an adhesive. Stays 127 are molded of a synthetic resin or the like which does not transmit vibrations so much and secured to the main casing 120 by an adhesive for mounting the air cleaner to the engine block. The main casing 120 is fixed to a carburetor (not shown) by means of a clamp 128 fastened by a bolt 129.

FIG. 6 illustrates a sectional construction of this embodiment including a spacer 130 for supporting the cover 121.

With the arrangement as above described, even if vibrations of the engine are transmitted to the air cleaner, the materials of the main casing 120 and cover 121 having high damping capacities prevent the vibrations and hence eliminate the noises from the vibrations of the air cleaner. On the other hand, the intake noises of the engine are reduced by the sound absorption effect of the volume of the air cleaner in conjunction with the sound absorption effect of the main casing 20 and cover 21 themselves, thereby reducing the intake noises dissipating through the air cleaner. As the result, the noises resulting from the vibrations of the engine and intake noises are reduced to keep remarkably quiet the operating engine.

Referring to FIG. 7 illustrating other embodiment of the invention, the main casing 120 and cover 121 made in the same manner as in the embodiment of FIG. 6 are coated on their surfaces with thin rubber films 131 to prevent dust or other foreign particles from entering slight clearances formed in the main casing 120 and cover 121. Instead of the rubber films 131, air-tight synthetic resin films may be employed for the same purpose. In any cases, it is necessary to provide the films which do not reduce the damping capacities of the main casing 120 and cover 121.

FIG. 8 shows a further embodiment of the invention which utilizes as filters the fine clearances formed in the main casing 120 and cover 121 of the above mentioned materials. The intake air is forced into the interior of the air cleaner through the clearances in the main casing 120 and cover 121 while the dust and other particles are removed from the intake air by the fibers in the main casing and cover. Accordingly, the air cleaner can dispense with the duct and further even the filter element as the case may be. Moreover, the cover 121 is formed on its surfaces with depressions and protrusions 121a to increase the surface areas whereby the air intake efficiency is improved.

FIGS. 9-12 illustrate other embodiment wherein the present invention is applied to a cylinder head cover. According to the invention, the cylinder head cover 211 consists of a fiber layer 212 and an oil-tight layer 213 formed on its inner surfaces. Organic or inorganic fibers mixed with phenol resin and a crosslinking agent (such as formaldehyde) therefor are shaped into the form of a cylinder head cover at a high temperature by means of a press causing a crosslinking reaction. Instead of the phenol resin, the acrylic resin may be used. The oil-tight layer 213 serves to prevent an engine oil from penetrating into the fiber layer 212 and for which purpose the inner surfaces of the fiber 212 are coated with an oil-resistant and heat-resistant resin such as polypropylene, polyethylene or the like or a rubber such as NBR to form the oil-tight layer 213.

The cylinder head cover 211 thus formed is fixed on an upper portion of a cylinder head 202 of the engine through an oil seal 203 by means of bolts 206 resting on retainers 214.

Figure 11:
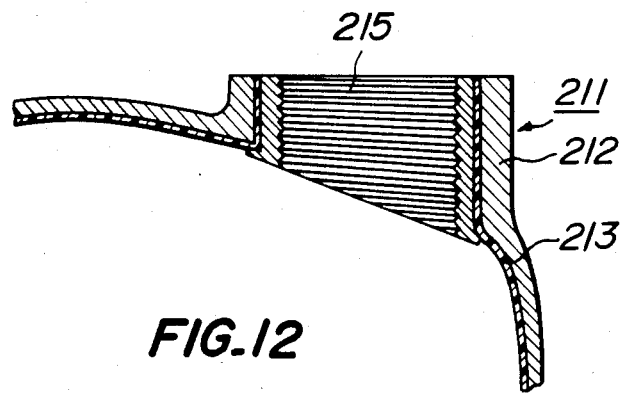
FIG. 11 is a partial cross-sectional view of the proximity of an oil filler hole of the cylinder head cover shown in FIG. 9.
Figure 12:
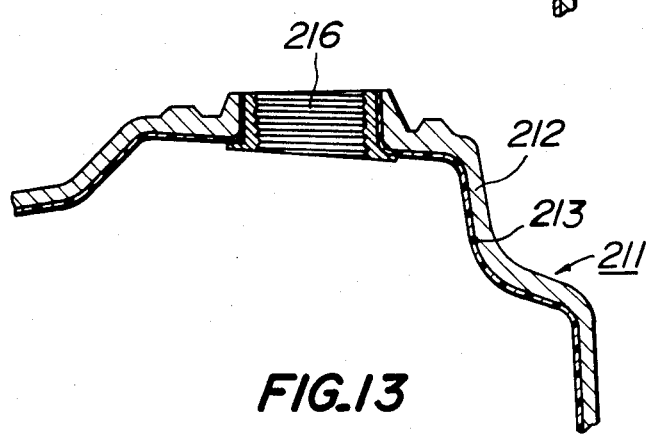
FIG. 12 is a partial cross-sectional view of the proximity of a blow-by gas outlet of the cylinder head cover shown in FIG. 9.

Fittings 215 and 216 made of a metal or synthetic resin and internally screw threaded as shown in FIGS. 11 and 12 are press fitted or fitted by an adhesive at an oil filler hole and a blow-by gas outlet, respectively, for securing an oil cap to the oil filler hole and a connector to the blow-by gas outlet of the cylinder head cover. The oil cap for the oil filler hole and connector for the blow-by gas outlet are threadedly engaged in the fittings 215 and 216.

With this arrangement, the oil-tight layer 213 formed on the inner surfaces of the cylinder head cover 211 can prevent the spreading or spattering of the engine oil out of the engine caused by the operation of the movable valves and prevent the engine oil from permeating into the fiber layer 212.

Moreover, as the cylinder head cover 211 according to the invention is substantially made of the fiber layer 212 formed by the crosslinking reaction of the phenol or acrylic resin, the slight clearances in the fibers and between the fibers provide a damping function which absorbs the vibrations of the cylinder head 202 caused by the combustion in the engine, thereby remarkably reducing the vibrations of the surfaces of the cylinder head cover 211. In addition, as the fiber layer 212 exhibits a sound absorbing function, the noises caused by the motions of the movable valves in the cylinder head cover 211 can also be reduced.

Figure 13:
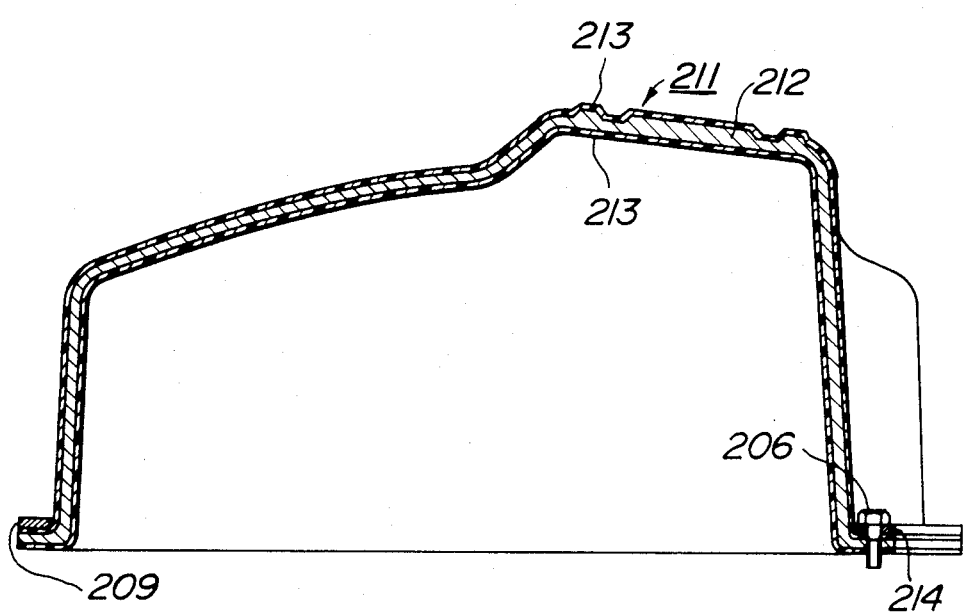
FIG. 13 is a sectional view of a cylinder head cover of another embodiment of the invention.

FIG. 13 illustrates a further embodiment of the invention, wherein an oil-tight layer 213 is further formed on the outer surface of the fiber layer 212 to prevent a penetration of water or oil from the outside of the cylinder head cover and facilitate the surface treatment thereof.

Figure 14:
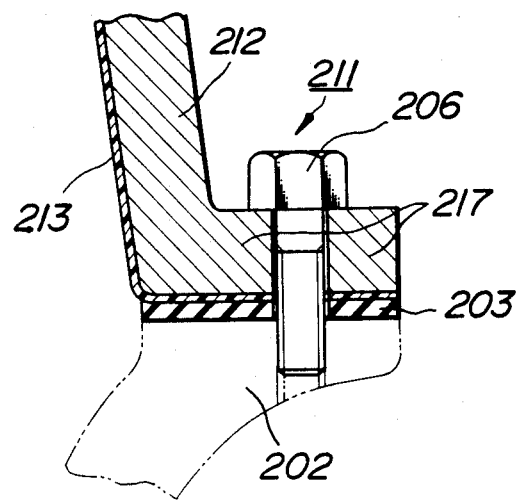
FIG. 14 is a partial sectional view of a cylinder head cover of further embodiment of the invention.

Referring to FIG. 14 illustrating another embodiment of the invention, all the peripheral mounting portions (flange) of the cylinder head cover 211 onto the cylinder head 202 is impregnated with a synthetic resin to form a resin-impregnated hardened layer 217 which enables the cylinder head cover 211 to dispense with the retainers 214 (FIGS. 9 and 13) for mounting the cylinder head cover 211 onto the cylinder head 202.

Figure 15:
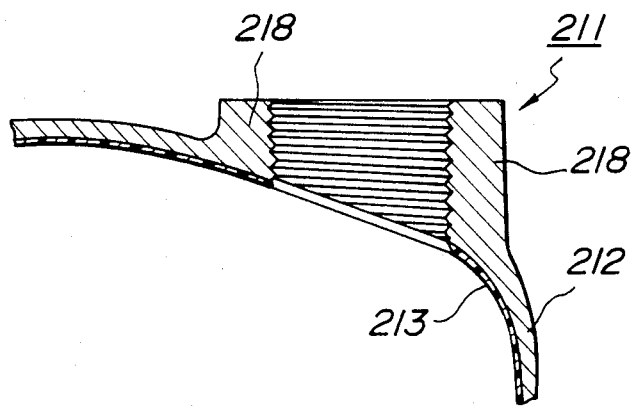
FIG. 15 is a partial sectional view of a cylinder head cover of another embodiment of the invention.

A further embodiment of the invention is shown in FIG. 15 wherein the portion surrounding the oil filler hole (or blow-by gas outlet) is impregnated with a synthetic resin to form a resin-impregnated hardened layer 218 and thereafter the layer 218 is directly formed with internal screw threads which eliminate the fitting 215 or 216 to simplify the construction of the cylinder head cover.

Figure 16:
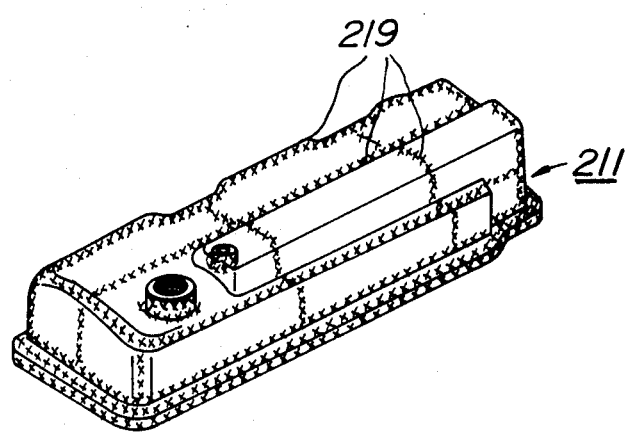
FIG. 16 is a perspective view of a cylinder head cover of further embodiment of the invention.
Figure 17:
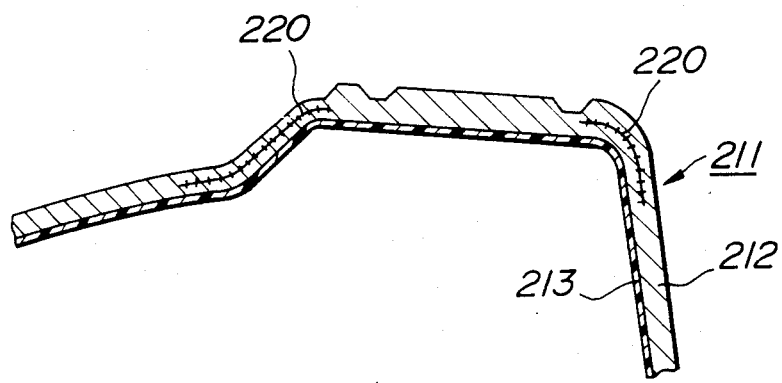
FIG. 17 is a cross-sectional view of a principal part of the cylinder head cover shown in FIG. 16.
Figure 21:
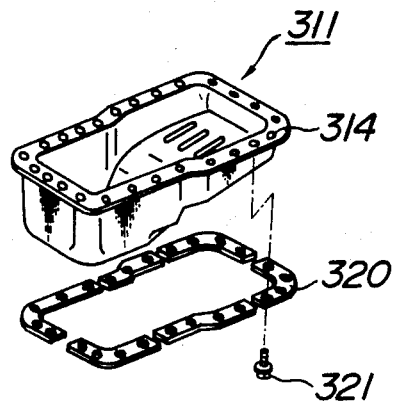
FIG. 21 is a perspective view of the oil pan shown in FIG. 18 and retainers for use therein.

In an embodiment of the present invention shown in FIGS. 16 and 17, wires 220 of a metal or synthetic resin are embedded in the fiber layer 212 as shown in FIG. 17 at locations 219 shown at x in the cylinder head cover 211 in FIG. 16 to increase the strength of the embedded portions of the cylinder head cover.

FIGS. 18–21 illustrate one embodiment of the invention, wherein an oil pan 311 consists of a fiber layer 312 and an oil-tight layers 313 formed on inner and outer surfaces thereof.

The fiber layer is formed by shaping organic or inorganic fibers mixed with phenol resin and its crosslinking agent (formaldehyde or the like) in a press into the form of an oil pan at a high temperature causing a crosslinking reaction. Instead of the phenol resin, acrylic resin may be used.

The oil-tight layers 313 prevent the engine oil from penetrating into the fiber layer 312 and for this purpose the inner and outer surfaces of the fiber layer 312 are coated with an oil-resistant and heat-resistant resin such as polypropylene, polyethylene or the like or a rubber such as NBR to form the oil-tight layer 313. The inner oil-tight layer 313 may be provided on the inside of the fiber layer 312 by a method other than coating. It may be previously molded in the form commensurating with the inside of the oil pan 311. A bracket 315 is fixed at an oil reservoir of the oil pan 311 by calking to form an oil drain as shown in FIGS. 20a and 20b. The bracket 315 for the oil drain is formed in its bottom and side surface with two engaging grooves 316 in symmetry adapted to be engaged with a pin 318 of an oil drain plug 317 including an O-ring 319 for the oil-tight as shown in FIG. 20.

The oil pan 311 thus formed is attached to the engine through an oil seal (not shown) by means of retainers 320 made of a metal or synthetic resin and bolts 321. A reference numeral 314 illustrates holes for the bolts 321.

With this arrangement, the oil-tight layers 313 formed on the inner and outer surfaces of the oil pan 311 prevent the engine oil, moisture from the outside and the like from penetrating into the fiber layer 312. Furthermore, as the oil pan 311 is substantially made of the fiber layer 312 formed by the crosslinking reaction of the phenol or acrylic resin, slight clearances in the fibers and between the fibers provide a damping function absorbing the most of the vibrations of the cylinder block caused by the combustion in the engine, thereby considerably reducing the vibrations at the surfaces of the oil pan 311. Moreover, the fiber layer 312 has a sound absorbing capacity to reduce the noises transmitted through the oil pan 311.

Figure 22:
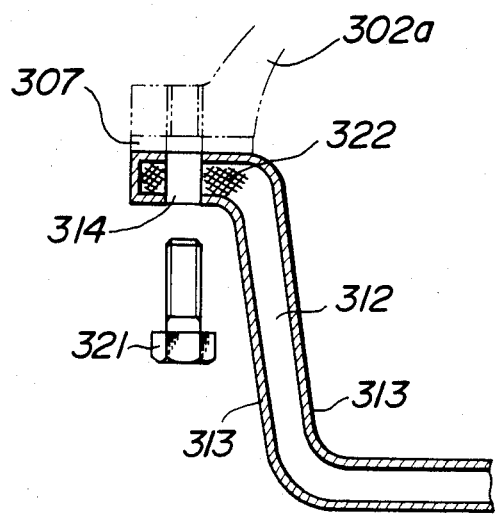
FIG. 22 is a partial sectional view of an oil pan of another embodiment of the invention.

FIG. 22 shows a further embodiment of the invention, wherein all the peripheral mounting portions (flange) of the oil pan 311 onto the skirt 302a of the engine is impregnated with a synthetic resin to form a resin-impregnated hardened layer 322 which enables the oil pan to dispense with the retainers for mounting the oil pan 311 onto the engine.

Figure 23:
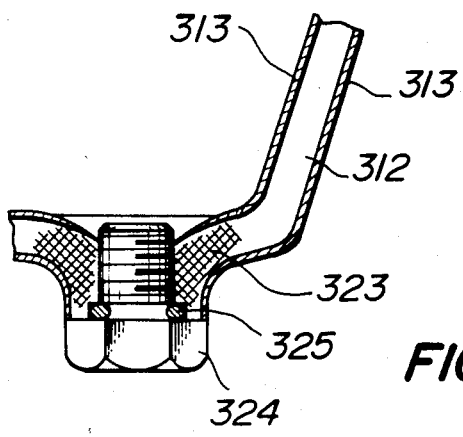
FIG. 23 is a partial sectional view of an oil pan of further embodiment of the invention.

Referring to FIG. 23 showing one preferred embodiment of the present invention, an oil drain portion of the fiber layer 312 is impregnated with a synthetic resin to form a resin-impregnated hardened layer 323 and thereafter the hardened layer 323 is formed with an internal screw thread adapted to be fitted with a bolt-type oil drain plug 324 through an O-ring 325 for an oil-tightness.

Figure 24:
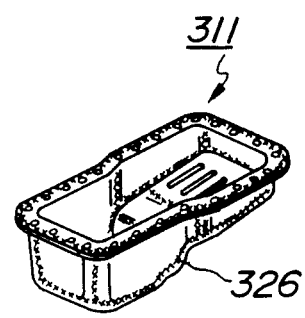
FIG. 24 is a perspective view of an oil pan of another embodiment of the invention.
Figure 25:
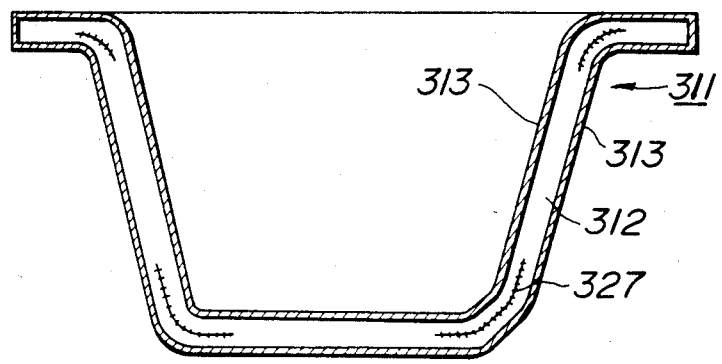
FIG. 25 is a sectional view of the principal part of the oil pan shown in FIG. 24.

Referring to an embodiment shown in FIGS. 24 and 25, wires 327 of a metal or synthetic resin are embedded in the fabric layer 312 as shown in FIG. 25 at locations 326 shown at x in the oil pan 311 in FIG. 24 to increase the strength of the embedded portions of the oil pan 311. Instead of the wires 327, the required portions of the fiber layer 312 are formed thicker before being pressed to increase the densities in those portions after completion of the pressing resulting in a higher strength of those portions.

Figure 26:
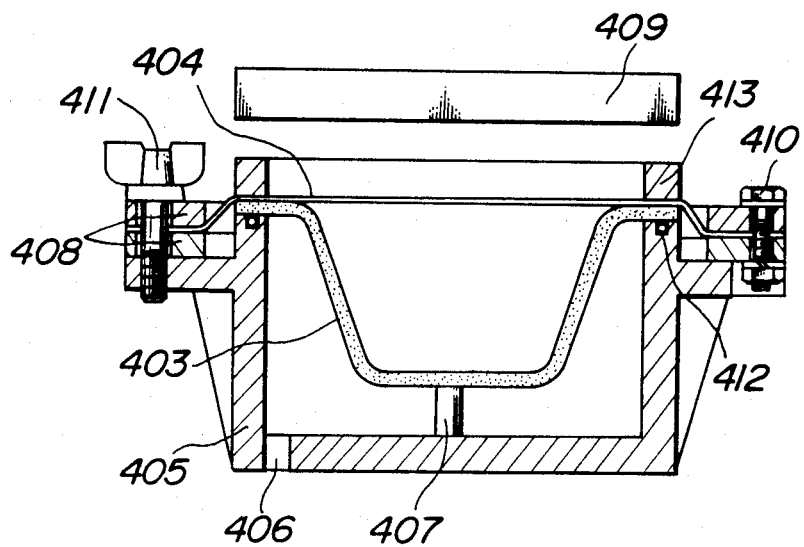
FIG. 26 is a sectional view for explaining how to apply an oil-tight film to an engine cover according to the invention.
Figure 27:
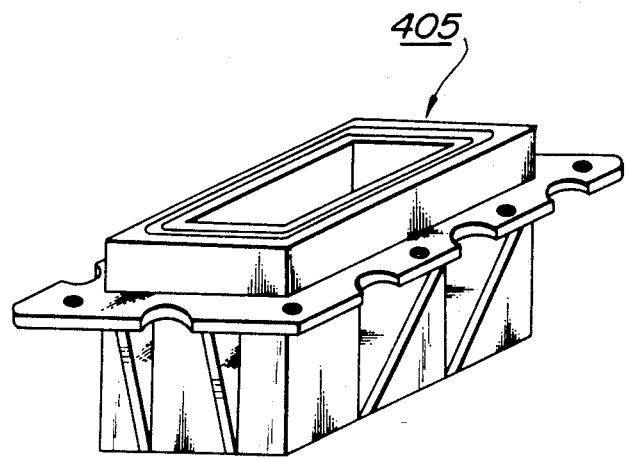
FIG. 27 is a perspective view of those of FIG. 26.
Figure 28:
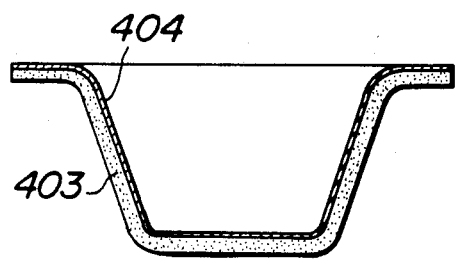
FIG. 28 is a sectional view of the engine cover provided with the oil-tight film in FIG. 26.

Referring to FIGS. 26–28 illustrating a further embodiment of the invention, a core layer 403 made of an air permeable material is previously molded in the form of an engine cover such as a cylinder head cover, oil pan or the like and supported by peripheries of a mold box 405 and a support 407. In this embodiment, the core layer 403 is formed by shaping organic or inorganic fibers mixed with phenol resin or acrylic resin and its crosslinking agent (formaldehyde or the like) in a press at a high temperature causing a crosslinking reaction. This material of the core layer is air permeable and has a high damping capacity and a high sound absorbing function and therefore is preferable for the material of engine cover or the like. In order to ensure an air-tightness between the core layer 403 and mold box 405, an O-ring 412 is provided on edges of the mold box. On the core layer 403 is arranged in an air-tight manner a film 404 of a heat softening rubber or synthetic resin whose ends are supported by means of clamps 408 and bolts 410 and 411. On the film 404 is further arranged a retainer 413 in order to improve the air-tightness between the film 404 and core layer 403 and between the core layer 403 and mold box 405. Above the retainer 413 is provided a heater 409 for heating. The mold box 405 is formed with an air suction hole 406.

First, the film 404 is heated by the heater 409 so as to be softened. Under this condition, the mold box is evacuated through the air suction hole 406 by means of a vacuum pump (not shown) so that the inside of the mold box 405 is brought under negative pressure or vacuum. At this moment, because of the core layer 403 made of the air permeable material, the thermosoftened film 404 is attracted to the inside of the core layer 403 and firmly fixed thereto by thermal welding to form an oil-tight layer 404 as shown in FIG. 28. After the completion of forming the layer 404, extra parts of the film 404 are of course cut off by a cutter or the like.

Figure 29:
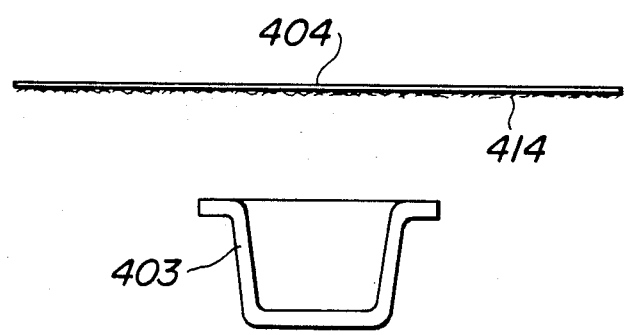
FIG. 29 is a sectional view of an engine cover of another embodiment of the invention.
Figure 30:
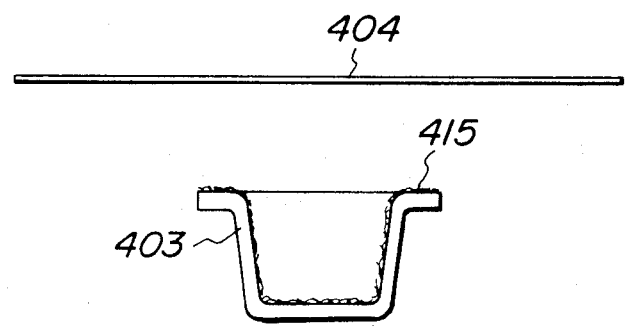
FIG. 30 is a sectional view of an engine cover of further embodiment of the invention.

FIGS. 29 and 30 illustrate further embodiments of the invention using films for the oil-tight layers 404 which do not weld to the core layers even if being heated. In the case of FIG. 29, synthetic resin powder 414 is attached to the lower surface of the film 404. In the case of FIG. 30, synthetic resin powder 415 is attached to the inner surfaces of the core layer 403. In the same manner as in the embodiment of FIG. 28, then the film 404 is heated and attracted to the core layer 403 so as to be fixed to the inside of the core layer with the aid of the melted resin 414 or 415.

As above described, the member according to the invention is made of fiber layers by shaping organic or inorganic fibers mixed with a resin and its crosslinking agent while heating so as to cause the crosslinking reaction. In case that the member is an engine cover, such as a cylinder head cover, oil pan or the like, an oil-tight layer is applied to at least the inner surface of the member. Even if vibrations are transmitted from an engine to the member, it does not vibrate owing its inherent damping capacity to prevent noises. In case that the member is an air cleaner, clearances in the fibers and between the fibers absorb noises caused by the intake air to remarkably decrease the noises associated with the engine as a whole. A cylinder cover such as a cylinder head cover or an oil pan according to the invention has a great damping capacity to absorb vibrations due to combustion in the engine, thereby remarkably decreasing the noises resulting from surface vibrations of the cylinder cover. The cylinder head cover has also a sound absorption effect which decreases noises due to operations of moving valves in the cylinder head cover. According to the invention, moreover, a core layer of a permeable material is shaped in an engine cover and thereafter a film of a synthetic resin or the like is arranged on the inside of the core layer and negative pressure is applied to the outside of the core layer to attract and fix the film to the inner surface of the core layer thereby forming an oil-tight layer. The film is not subjected to a strong frictional force which would occur when the core layer and film are simultaneously formed by pressing and therefore a complete oil-tight film can be formed without breakage of the film. As the substantially uniform suction force exerts on all over surfaces of the core layer, the oil-tight layer for engine covers having complicated configurations can easily be formed.

It is further understood by those skilled in the art that the foregoing description is preferred embodiments of the disclosed member and that various changes and modifications may be made in the invention without departing from the spirit and scope thereof.

What is claimed is:

1. A noise-reducing member attached to an engine, said member being shaped in the form of a layer and having a flange portion for attachment to said engine, said member being formed from a homogeneous body comprising fibers selected from the group consisting of organic and inorganic fibers, said fibers having been mixed with a resin binder and a crosslinking agent for the binder, and heated to effect cross linking of the crosslinking agent to form said shaped layer; said flange portion only further being impregnated with a synthetic resin, without impregnating the remainder of said member, to form a resulting resin-impregnated hardened flange portion; said member, when attached to the engine through said flange portion, being effective to damp vibrations transmitted from the engine.

2. A member as set forth in claim 1, wherein said layer is formed on its surface with depressions and protrusions to increase its surface area.

3. A member as set forth in claim 1, wherein said layer is locally impregnated with a synthetic resin to form a resulting resin-impregnated hardened layer.

4. A member as set forth in claim 1, further containing a member selected from the group consisting of metallic wires and synthetic resin wires embedded in said layer as reinforcement.

5. A member as set forth in claim 1 further comprising a rubber film which covers the surface of said layer.

6. A member as set forth in claim 5, wherein said rubber film is a NBR film.

7. A member as set forth in claim 1 further comprising a synthetic resin film which covers the surface of said layer.

8. A member as set forth in claim 7, wherein said synthetic resin film is selected from the group consisting of a polypropylene film and a polyethylene film.

9. A member as set forth in claim 1, wherein said resin is selected from the group consisting of acrylic and phenolic resins and said crosslinking agent is formaldehyde.

10. A member as set forth in claim 9 further comprising a rubber film which covers the surface of said layer.

11. A member as set forth in claim 9 further comprising a synthetic resin film which covers the surface of said layer.

* * * * *